US011656201B2

(12) United States Patent
Soejima et al.

(10) Patent No.: US 11,656,201 B2
(45) Date of Patent: May 23, 2023

(54) STRUCTURAL HEALTH MONITORING SYSTEM

(71) Applicant: SUBARU CORPORATION, Tokyo (JP)

(72) Inventors: Hideki Soejima, Tokyo (JP); Takuya Nakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 127 days.

(21) Appl. No.: 17/136,615

(22) Filed: Dec. 29, 2020

(65) Prior Publication Data

US 2021/0302372 A1    Sep. 30, 2021

(30) Foreign Application Priority Data

Mar. 27, 2020   (JP) .............................. JP2020-056962

(51) Int. Cl.
*G01N 29/04* (2006.01)

(52) U.S. Cl.
CPC ... *G01N 29/041* (2013.01); *G01N 2291/0289* (2013.01); *G01N 2291/2694* (2013.01)

(58) Field of Classification Search
CPC .... G01N 29/041; G01N 29/069; G01N 29/11; G01N 29/12; G01N 2291/0289; G01N 2291/015; G01N 2291/0244; G01N 2291/0658

See application file for complete search history.

(56) References Cited

U.S. PATENT DOCUMENTS

| 5,184,516 A * | 2/1993 | Blazic ................. G01M 5/0033 324/718 |
| 10,401,316 B2 | 9/2019 | Arsenault et al. |
| 10,416,121 B2 | 9/2019 | Takahashi |

(Continued)

FOREIGN PATENT DOCUMENTS

| JP | 2016-173336 A | 9/2016 |
| JP | 2017-173191 A | 9/2017 |

(Continued)

OTHER PUBLICATIONS

Extended European Search Report issued in corresponding European Patent Application No. 21157130.2-1001, dated Jul. 20, 2021.

*Primary Examiner* — Tarun Sinha
(74) *Attorney, Agent, or Firm* — McDermott Will & Emery LLP (57) ABSTRACT

According to one implementation, a structural health monitoring system includes an ultrasonic transducer, an ultrasonic sensor, a strain sensor and a signal processing part. The ultrasonic transducer oscillates an ultrasonic wave to the first inspection area. The ultrasonic sensor detects a waveform of at least one of a transmission wave of the ultrasonic wave and a reflected wave of the ultrasonic wave. The transmission wave has transmitted the first inspection area. The reflected wave has been reflected in the first inspection area. The strain sensor detects a strain amount of the second inspection area. The signal processing part obtains at least one index, representing health of the structural object including the first inspection area and the second inspection area, based on the waveform detected by the ultrasonic sensor and the strain amount detected by the strain sensor.

20 Claims, 6 Drawing Sheets

(56) References Cited

U.S. PATENT DOCUMENTS

| | | | |
|---|---|---|---|
| 10,481,131 B2 | 11/2019 | Takahashi | |
| 2017/0276648 A1* | 9/2017 | Takahashi | G01N 29/043 |
| 2019/0033267 A1 | 1/2019 | Soejima | |
| 2019/0112072 A1* | 4/2019 | Abe | G01M 5/0041 |

FOREIGN PATENT DOCUMENTS

| | | |
|---|---|---|
| JP | 2018-146368 A | 9/2018 |
| WO | 2017/175692 A1 | 10/2017 |
| WO | 2018/055827 A1 | 3/2018 |

* cited by examiner

STRUCTURAL HEALTH MONITORING SYSTEM

CROSS REFERENCES TO RELATED APPLICATIONS

This application is based upon and claims the benefit of priority from Japanese Patent Application No. 2020-56962, filed on Mar. 27, 2020; the entire contents of which are incorporated herein by reference.

FIELD

Implementations described herein relate generally to a structural health monitoring system, a method of monitoring structural health and an aircraft structural object.

BACKGROUND

Conventionally, technology utilizing ultrasonic waves is known as one of SHM (Structural Health Monitoring) technology which inspects health of a structural object, such as an aircraft structural object, a building, a windmill, a bridge or a pipeline (for example, refer to Japanese Patent Application Publication JP 2016-173336A, Japanese Patent Application Publication JP 2017-173191A, and International Publication WO 2017/175692A). In the SHM using ultrasonic waves, whether a defect, such as a damaged portion, has arisen or not in a structural object and/or the degree of progress of a defect which has arisen in a structural object are diagnosed by analyzing variations in ultrasonic waveforms, with attaching actuators for oscillating the ultrasonic waves and ultrasonic sensors, such as optical fibers, for detecting the ultrasonic waveforms, to the structural object.

Meanwhile, technology for diagnosing whether a defect, such as a damaged portion, has arisen or not in a structural object while monitoring loads being applied on the structural object, by detecting strain amounts of the structural object with strain sensors, such as strain gauges or optical fiber sensors, and analyzing variations of the strain amounts is also known as another one of the SHM technology (for example, refer to International Publication WO 2018/055827A and Japanese Patent Application Publication JP 2018-146368A).

The conventional SHM technique based on changes in ultrasonic waveforms has disadvantage that a structural object cannot be inspected unless at least one ultrasonic wave is oscillated and disadvantage that a portion of a structural object having a shape propagating no ultrasonic wave cannot be inspected. On the other hand, the conventional SHM technique based on changes in strain amounts has disadvantage that many strain sensors have to be disposed so as to cover an inspection area since sensitivity of change in strain amount is low compared with that of change in ultrasonic waveform.

Accordingly, various restrictions arise in any of a case of adopting the SHM technique utilizing ultrasonic waves and a case of adopting the SHM technique utilizing strain sensors. Consequently, practical realization of SHM technology for inspecting an aircraft structural object or the like, having wide inspection areas and a complicated shape, has not been progressed. In particular, an aircraft structural object made of an FRP (Fiber Reinforced Plastic), such as GFRP (Glass Fiber Reinforced Plastic) or CFRP (Carbon Fiber Reinforced Plastic) has been inspected visually by an inspector before and after a flight although a defect, such as damage due to a shock, during a flight of the aircraft is desirable to be detected.

Accordingly, an object of the present invention is to reduce restriction in SHM of a structural object and improve the detection accuracy of a defect.

SUMMARY OF THE INVENTION

In general, according to one implementation, a structural health monitoring system monitors structural health of a structural object having a plate-like first inspection area and a second inspection area. The first inspection area has no bent portion. The second inspection area includes a bent plate-like portion. The structural health monitoring system includes an ultrasonic transducer, an ultrasonic sensor, a strain sensor and a signal processing part. The ultrasonic transducer oscillates an ultrasonic wave to the first inspection area. The ultrasonic sensor detects a waveform of at least one of a transmission wave of the ultrasonic wave and a reflected wave of the ultrasonic wave. The transmission wave has transmitted the first inspection area. The reflected wave has been reflected in the first inspection area. The strain sensor detects a strain amount of the second inspection area. The signal processing part obtains at least one index, representing health of the structural object including the first inspection area and the second inspection area, based on the waveform detected by the ultrasonic sensor and the strain amount detected by the strain sensor.

Further, according to one implementation, an aircraft structural object includes the above-mentioned structural health monitoring system.

Further, according to one implementation, a method of monitoring the above-mentioned structural health of the structural object includes using the above-mentioned structural health monitoring system.

Further, according to one implementation, a method of monitoring structural health of a structural object having a plate-like first inspection area, having no bent portion, and a second inspection area, including a bent plate-like portion, includes: oscillating an ultrasonic wave to the first inspection area by an ultrasonic transducer; detecting a waveform of at least one of a transmission wave of the ultrasonic wave, having transmitted the first inspection area, and a reflected wave of the ultrasonic wave, having been reflected in the first inspection area, by an ultrasonic sensor; detecting a strain amount of the second inspection area by a strain sensor; and obtaining an index, representing health of the structural object including the first inspection area and the second inspection area, based on the waveform detected by the ultrasonic sensor and the strain amount detected by the strain sensor.

DETAILED DESCRIPTION

A structural health monitoring system, a method of monitoring structural health and an aircraft structural object according to implementations of the present invention will be described with reference to accompanying drawings.

(Structural Health Monitoring System)

Figure 1:
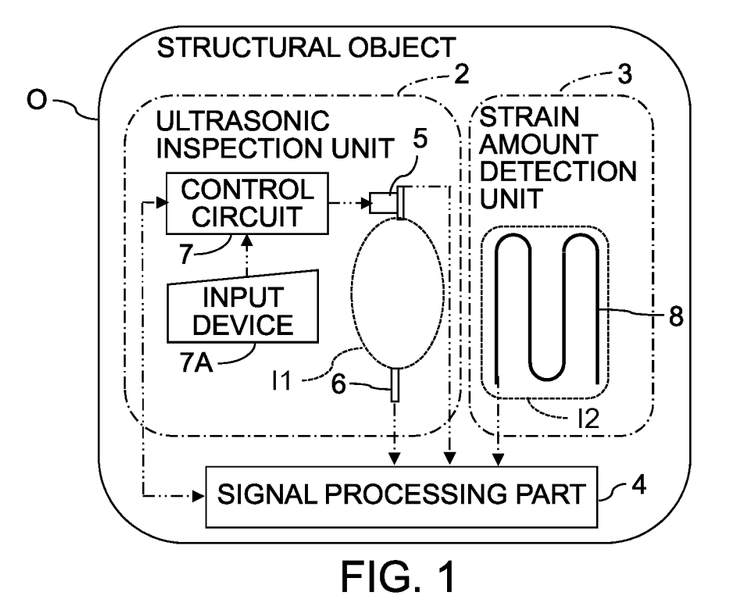
FIG. 1 is a configuration diagram of a structural health monitoring system according to an implementation of the present invention.

FIG. 1 is a configuration diagram of a structural health monitoring system according to an implementation of the present invention.

A structural health monitoring system 1 performs SHM of a structural object O, having the plate-like first inspection area I1 without any bent portion and the second inspection area I2 including at least one bent plate-like portion. The first inspection area I1 and the second inspection area I2 may partially overlap with each other, or may be distinct areas which do not entirely overlap with each other. Therefore, it can be said that the first inspection area I1 and the second inspection area I2 are the areas of which at least a part including a bent platy portion does not overlap.

Examples of the structural object O, which has the platy first inspection area I1 with no bent portion and the second inspection area I2 including at least one bent platy portion, include an aircraft structural object having a panel and at least one reinforcing member, attached to the panel and composed of at least one of a stringer, a spar, a rib and a frame. Therefore, the structural health monitoring system 1 is attached to the structural object O, such as an aircraft structural object having a structure in which a panel has been reinforced by at least one reinforcing member.

The structural health monitoring system 1 is configured to perform SHM of the first inspection area I1 and the second inspection area I2 by ultrasonic inspection of the first inspection area I1 and measurement of strain amounts in the second inspection area I2. Therefore, the structural health monitoring system 1 has an ultrasonic inspection unit 2 for the ultrasonic inspection of the first inspection area I1, a strain amount detection unit 3 for measuring the strain amounts in the second inspection area I2 and a signal processing part 4.

The ultrasonic inspection unit 2 is composed of at least one ultrasonic transducer 5, such as a piezoelectric ceramic, at least one ultrasonic sensor 6, and a control circuit 7 including an electric circuit, such as a pulser. Each ultrasonic transducer 5 oscillates an ultrasonic wave in the first inspection area I1. Each ultrasonic sensor 6 detects a waveform of at least one of an ultrasonic transmission wave, which has transmitted the first inspection area I1, and an ultrasonic reflected wave, which has been reflected in the first inspection area I1. The control circuit 7 controls each ultrasonic transducer 5 to oscillate an ultrasonic wave in the first inspection area I1. On the other hand, the strain amount detection unit 3 has at least one strain sensor 8.

When ultrasonic inspection of a plate material is performed, a particularly preferable ultrasonic wave is a Lamb wave from a viewpoint of improving SNR (signal to noise ratio) and accuracy. Therefore, it is preferable to oscillate a Lamb wave as an ultrasonic wave from each ultrasonic transducer 5 of the ultrasonic inspection unit 2. A Lamb wave is an ultrasonic wave, propagating a thin plate of which thickness is not more than half of the wavelength of the ultrasonic wave, and having mixed symmetric and asymmetric modes.

When only an ultrasonic transmission wave which has transmitted the first inspection area I1 is to be detected by the ultrasonic sensor 6, the ultrasonic transducer 5 is disposed at a position opposed to the ultrasonic sensor 6 across to the first inspection area I1 so that the ultrasonic wave which has been oscillated from the ultrasonic transducer 5 and has propagated the first inspection area I1 can be received by the ultrasonic sensor 6. When only an ultrasonic reflected wave which has been reflected in the first inspection area I1 is to be detected by the ultrasonic sensor 6, the ultrasonic transducer 5 and the ultrasonic sensor 6 can be disposed in the vicinity of each other, for example, so that the ultrasonic reflected wave which has been oscillated from the ultrasonic transducer 5 and has been reflected in the first inspection area I1 can be received by the ultrasonic sensor 6. Alternatively, the ultrasonic transducer 5 and the ultrasonic sensor 6 may be composed of a common ultrasonic transducer by concurrently using the ultrasonic transducer 5 as the ultrasonic sensor 6.

When both of an ultrasonic transmission wave, which has transmitted the first inspection area I1, and an ultrasonic reflected wave, which has been reflected in the first inspection area I1, are to be detected, the ultrasonic sensors 6 may be disposed per one ultrasonic transducer 5, and/or the ultrasonic transducers 5 may be disposed per one ultrasonic sensor 6.

Figure 2:
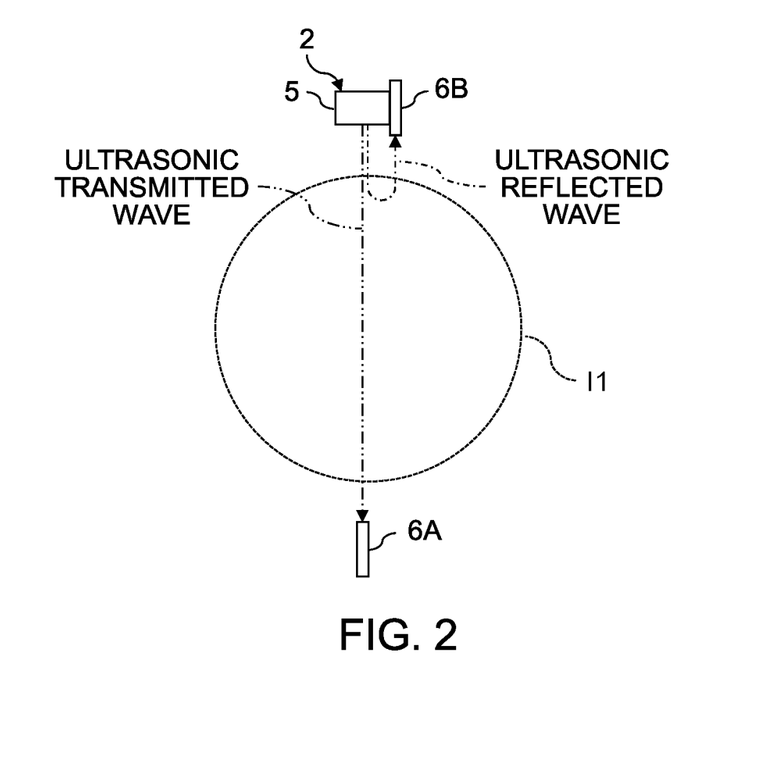
FIG. 2 shows the first arrangement example of the ultrasonic transducer and the ultrasonic sensors in case of detecting both an ultrasonic transmission wave, which has transmitted the first inspection area, and an ultrasonic reflected wave, which has been reflected in the first inspection area, by the ultrasonic inspection unit shown in FIG. 1.

FIG. 2 shows the first arrangement example of the ultrasonic transducer 5 and the ultrasonic sensors 6 in case of detecting both an ultrasonic transmission wave, which has transmitted the first inspection area I1, and an ultrasonic reflected wave, which has been reflected in the first inspection area I1, by the ultrasonic inspection unit 2 shown in FIG. 1.

As shown in FIG. 2, when the ultrasonic transducer 5 is disposed at a position opposed to the first ultrasonic sensor 6A across the first inspection area I1 while the second ultrasonic sensor 6B is disposed in parallel near the ultrasonic transducer 5, an ultrasonic transmission wave which has transmitted the first inspection area I1 can be detected by the first ultrasonic sensor 6A while an ultrasonic reflected wave which has been reflected in the first inspection area I1 can be detected by the second ultrasonic sensor 6B.

Figure 3:
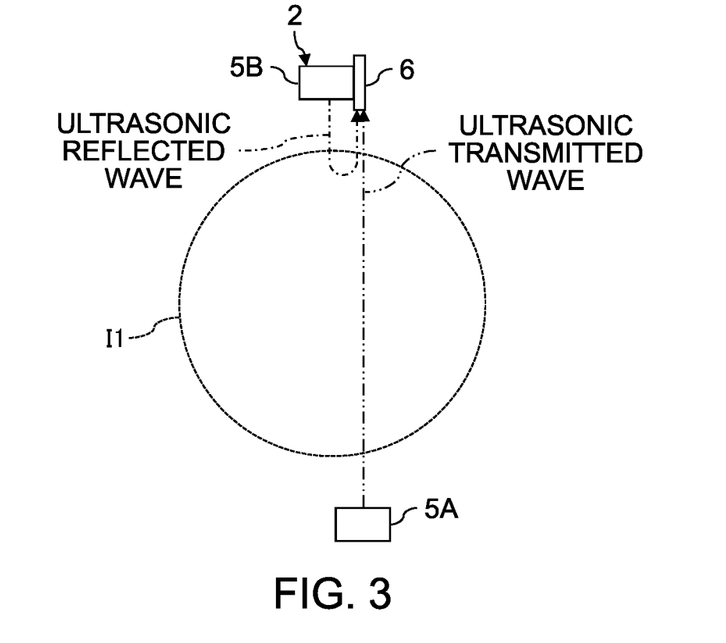
FIG. 3 shows the second arrangement example of the ultrasonic transducers and the ultrasonic sensor in case of detecting both an ultrasonic transmission wave, which has transmitted the first inspection area, and an ultrasonic reflected wave, which has been reflected in the first inspection area, by the ultrasonic inspection unit shown in FIG. 1.

FIG. 3 shows the second arrangement example of the ultrasonic transducers 5 and the ultrasonic sensor 6 in case of detecting both an ultrasonic transmission wave, which has transmitted the first inspection area I1, and an ultrasonic reflected wave, which has been reflected in the first inspection area I1, by the ultrasonic inspection unit 2 shown in FIG. 1.

As shown in FIG. 3, when the first ultrasonic transducer 5A is disposed at a position opposed to the ultrasonic sensor 6 across the first inspection area I1 while the second ultrasonic transducer 5B is disposed in parallel near the ultrasonic sensor 6, an ultrasonic wave which has been oscillated from the first ultrasonic transducer 5A and has transmitted the first inspection area I1 can be detected by the ultrasonic sensor 6 while an ultrasonic wave which has been oscillated from the second ultrasonic transducer 5B and has been reflected in the first inspection area I1 can be detected by the ultrasonic sensor 6.

Figure 4:
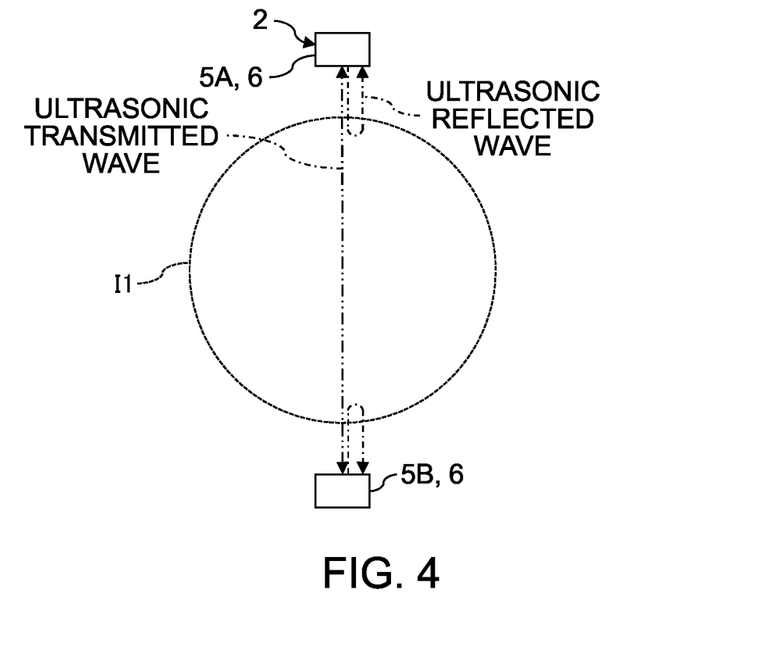
FIG. 4 shows the third arrangement example of the ultrasonic transducers and the ultrasonic sensors in case of detecting both an ultrasonic transmission wave, which has transmitted the first inspection area, and an ultrasonic reflected wave, which has been reflected in the first inspection area, by the ultrasonic inspection unit shown in FIG. 1.

FIG. 4 shows the third arrangement example of the ultrasonic transducers 5 and the ultrasonic sensors 6 in case of detecting both an ultrasonic transmission wave, which has transmitted the first inspection area I1, and an ultrasonic reflected wave, which has been reflected in the first inspection area I1, by the ultrasonic inspection unit 2 shown in FIG. 1.

As shown in FIG. 4, the first ultrasonic transducer 5A can be disposed at a position opposed to the second ultrasonic transducer 5B across the first inspection area I1. In this case, an ultrasonic wave which has been oscillated from one of the first ultrasonic transducer 5A and the second ultrasonic transducer 5B, and subsequently has transmitted the first inspection area I1 can be detected by the other of the first ultrasonic transducer 5A and the second ultrasonic transducer 5B. That is, the other of the first ultrasonic transducer 5A and the second ultrasonic transducer 5B can be used as the ultrasonic sensor 6.

When the first ultrasonic transducer 5A is also used as the ultrasonic sensor 6, an ultrasonic wave which has been oscillated from the first ultrasonic transducer 5A and subsequently has been reflected in the first inspection area I1 can be detected by the first ultrasonic transducer 5A which also functions as the ultrasonic sensor 6. Similarly, when the second ultrasonic transducer 5B is also used as the ultrasonic sensor 6, an ultrasonic wave which has been oscillated from the second ultrasonic transducer 5B and subsequently has been reflected in the first inspection area I1 can be detected by the second ultrasonic transducer 5B which also functions as the ultrasonic sensor 6.

When the first inspection area I1 is large, the first inspection area I1 may be divided into subareas, and then the ultrasonic transducers 5 and the ultrasonic sensors 6 may be disposed so that the first inspection area I1 can be covered. In other words, the first inspection areas I1 may be overlapped with each other, and then at least one ultrasonic transducer 5 and at least one ultrasonic sensor 6 may be disposed per one first inspection area I1. In that case, ultrasonic inspection can be also performed based on ultrasonic waveforms obtained from each overlapped common area.

As the ultrasonic sensor 6, an optical fiber sensor which does not oscillate an ultrasonic wave but only detects an ultrasonic wave can be used, besides an ultrasonic transducer which can transmit and receive an ultrasonic wave. Examples of an optical fiber sensor include an FBG sensor and a PS-FBG (Phase-shifted FBG) sensor. The PS-FBG is an FBG in which a local phase shift has been introduced into a periodic change of the refractive index.

When an optical fiber sensor is used as the ultrasonic sensor 6, necessary optical elements and a light source which makes laser light incident in the optical fiber sensor are coupled to the optical fiber sensor. A signal, representing an ultrasonic waveform, detected by an optical fiber sensor may be transmission light or reflected light through or from the optical fiber sensor.

Figure 5:
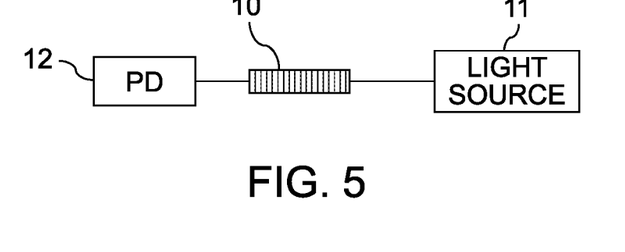
FIG. 5 is a circuit diagram showing an example of an optical signal circuit for outputting a physical quantity, measured by an optical fiber sensor, as an optical signal of transmission light.

FIG. 5 is a circuit diagram showing an example of an optical signal circuit for outputting a physical quantity, measured by an optical fiber sensor 10, as an optical signal of transmission light.

When the optical fiber sensor 10, such as an FBG sensor or a PS-FBG sensor, is attached to an object as shown in FIG. 5, the wavelength distribution of transmission light and the wavelength distribution of reflected light from the optical fiber sensor 10 each changes according to displacement arising in the object. Therefore, when a light source 11 is coupled to one end of the optical fiber sensor 10 while a photodetector 12 is coupled to the other end of the optical fiber sensor 10, a displacement amount of the object can be detected as a change amount in wavelength of transmission light from the optical fiber sensor 10, detected by the photodetector 12. That is, a displacement amount of the object is converted into a change amount in the wavelength of the transmission light from the optical fiber sensor 10, and an optical signal is output, as transmission light of which wavelength changes, from the optical fiber sensor 10.

Therefore, when the optical fiber sensor 10 is disposed at a position at which an ultrasonic wave should be detected, it becomes possible to detect an ultrasonic waveform as a waveform of wavelength vibration of transmission light from the optical fiber sensor 10 since vibration of minute displacement of the structural object O due to the ultrasonic wave is converted into the vibration of the wavelength of the transmission light. As a matter of course, desired optical elements, such as an optical filter for removing noise of an optical signal, may also be coupled.

Figure 6:
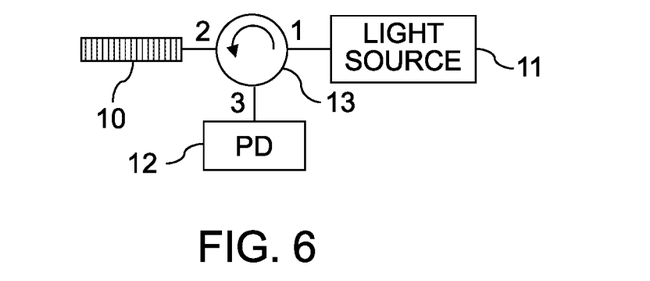
FIG. 6 is a circuit diagram showing an example of an optical signal circuit for outputting a physical quantity, measured by an optical fiber sensor, as an optical signal of reflected light.

FIG. 6 is a circuit diagram showing an example of an optical signal circuit for outputting a physical quantity, measured by an optical fiber sensor 10, as an optical signal of reflected light.

When an optical circulator 13 is coupled to one end of the optical fiber sensor 10, and then the light source 11 is coupled to the input port of the optical circulator 13 while the photodetector 12 is coupled to the output port of the optical circulator 13 as shown in FIG. 6, reflected light from the optical fiber sensor 10 can be detected by the photodetector 12. Therefore, a displacement amount of the object can be detected as a change amount in wavelength of the reflected light from the optical fiber sensor 10, detected by the photodetector 12. That is, a displacement amount of the object is converted into a change amount in the wavelength of the reflected light from the optical fiber sensor 10, and an optical is output from the optical fiber sensor 10 as reflected light of which wavelength changes.

Therefore, when the optical fiber sensor 10 is disposed at a position at which an ultrasonic wave should be detected, it becomes possible to detect an ultrasonic waveform as a waveform of wavelength vibration of reflected light from the optical fiber sensor 10 since vibration of minute displacement of the structural object O due to the ultrasonic wave is converted into the vibration of the wavelength of the reflected light. As a matter of course, desired optical elements, such as an optical filter for removing noise of an optical signal, may also be coupled.

As described above, the ultrasonic inspection unit 2 detects at least one ultrasonic waveform in the first inspection area I1 by the ultrasonic sensor 6 or the ultrasonic sensors 6, such as the optical fiber sensor 10 or the optical fiber sensors 10. Meanwhile the strain amount detection unit 3 measures strain amounts of the second inspection area I2.

The strain amount detection unit 3 is composed of the at least one strain sensor 8, for detecting strain amounts of the second inspection area I2, and necessary circuit elements according to a kind of each strain sensor 8. Although a strain gauge may be used as the strain sensor 8, the above-mentioned optical fiber sensor 10 may be also used as the strain sensor 8 with high sensitivity.

Specifically, when the optical fiber sensor 10 is attached to the second inspection area I2, strain amounts in the second inspection area I2 can be output as an optical signal consisting of transmission light or reflected light from the optical fiber sensor 10 since the light transmission characteristic and light reflection characteristic of the optical fiber sensor 10 change according to the strain amounts in the second inspection area I2. In this case, adopting known techniques, such as use of a wide band laser light, series coupling of the optical fiber sensors 10 in which lights in different wavelength bands are transmitted or reflected, and multiplexing of optical signals output from the optical fiber sensors 10, makes it possible to obtain optical signals representing strain amounts and positions at which strain has arisen in the second inspection area I2.

As mentioned above, the ultrasonic inspection unit 2 performs ultrasonic inspection of the platy first inspection area I1 having no bent portion. Therefore, each ultrasonic transducer 5 and each ultrasonic sensor 6 of the ultrasonic inspection unit 2 are attached to the platy first inspection area I1 with no bent portion. On the other hand, the strain amount detection unit 3 measures strain amounts in the second inspection area I2 including at least one bent platy portion. Therefore, each strain sensor 8 of the strain amount detection unit 3 is attached to the second inspection area I2 including the at least one bent platy portion.

The reason why the ultrasonic inspection is performed for the platy first inspection area I1 with no bent portion while strain amounts are measured in the second inspection area I2 including at least one bent platy portion is as follows. An ultrasonic wave, such as a Lamb wave, has advantage that inspection can be carried out for a wide area compared with inspection of strain amounts since the ultrasonic wave propagates in a wider range. Meanwhile, an ultrasonic wave has disadvantage that inspection with sufficient accuracy cannot be performed for a portion having a complicated shape since the ultrasonic wave does not propagate with sufficient strength unless its medium has a flat surface or a sufficiently small curvature. On the contrary, the strain sensor 8 has advantage that strain amounts of an object can be detected even when the object has a complicated shape. Meanwhile, the strain sensor 8 has disadvantage that the strain sensor 8 can detect strain amounts only in a narrow range compared with that in ultrasonic inspection.

Accordingly, when a Lamb wave is used as an ultrasonic wave in particular, a rational method for determining inspection areas with taking advantage of the characteristics of the respective physical quantities is to determine an area including at least one plate-like bent portion as the second inspection area I2 and a plate-like area, having no bent portion, wider than the second inspection area I2, as the first inspection area I1, based on the characteristic of a Lamb wave that a Lamb wave propagates in a wider range compared with a range in which a change in strain amount propagates although an attenuation amount in amplitude is large in a bent plate-like portion compared with that of a change in strain amount, and the characteristic of a change in strain amount that an attenuation amount in amplitude is small in a bent plate-like portion compared with that of a Lamb wave although a change in strain amount propagates in a narrower range compared with a range in which a Lamb wave propagates.

Figure 7:
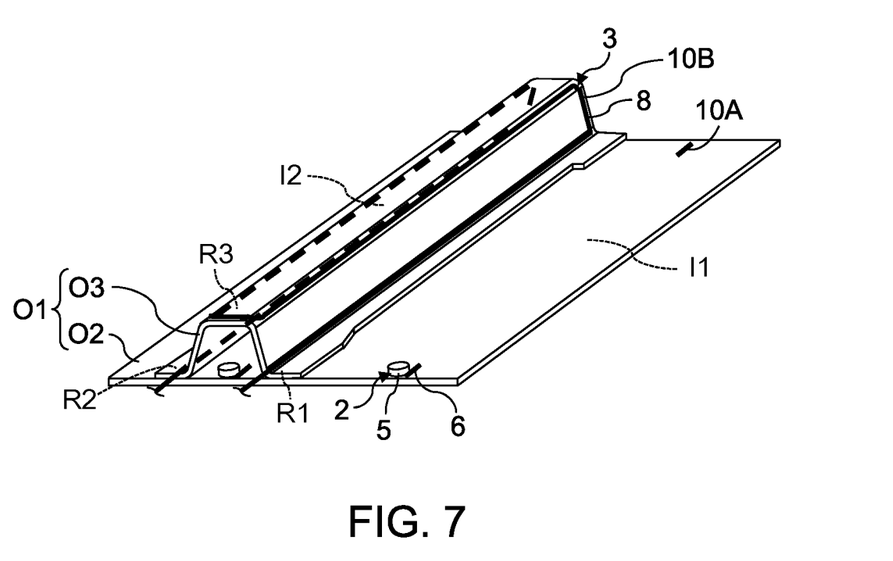
FIG. 7 is a perspective view showing an example of the ultrasonic transducers, the ultrasonic sensors and the strain sensor attached to an aircraft structural object.

FIG. 7 is a perspective view showing an example of the ultrasonic transducers 5, the ultrasonic sensors 6 and the strain sensor 8 attached to an aircraft structural object O1.

As exemplified by FIG. 7, the ultrasonic transducers 5, the ultrasonic sensors 6 and the strain sensor 8 can be attached to the aircraft structural object O1 composed of a panel O2 and a stringer O3, having a hat-shaped cross section, for reinforcing the panel O2. The panel O2 has a flat plate-like structure or a plate-like structure having a small curvature. Therefore, the ultrasonic transducers 5 and the ultrasonic sensors 6 can be attached to the panel O2 so that ultrasonic inspection can be performed for the first inspection area I1 of the panel O2. Meanwhile, the hat-shaped stringer O3 has a complicated shape including bent plate-like portions. Therefore, the strain sensor 8 can be attached to the hat-shaped stringer O3 so that strain amounts can be measured in the second inspection area I2 of the hat-shaped stringer O3.

In the example shown in FIG. 7, the first optical fiber sensors 10A are attached, as the ultrasonic sensors 6, on the panel O2 while the second optical fiber sensor 10B is attached, as the strain sensor 8, on the hat-shaped stringer O3 on which a large load applies compared with that applied on the panel O2. In addition, the ultrasonic transducers 5 and the ultrasonic sensors 6 are also disposed inside the hat-shaped stringer O3 so that ultrasonic inspection can be carried out for a part of the panel O2 lying inside the hat-shaped stringer O3.

As a matter of course, the ultrasonic transducers 5, the ultrasonic sensors 6 and the strain sensor 8 may be attached to the aircraft structural object O1 including not only the hat-shaped stringer O3 but also a reinforcing member, such as an I-shaped stringer or a T-shaped stringer, which may have various shapes, attached to the panel O2, so that both the ultrasonic inspection and the strain amount measurement can be performed.

Figure 8:
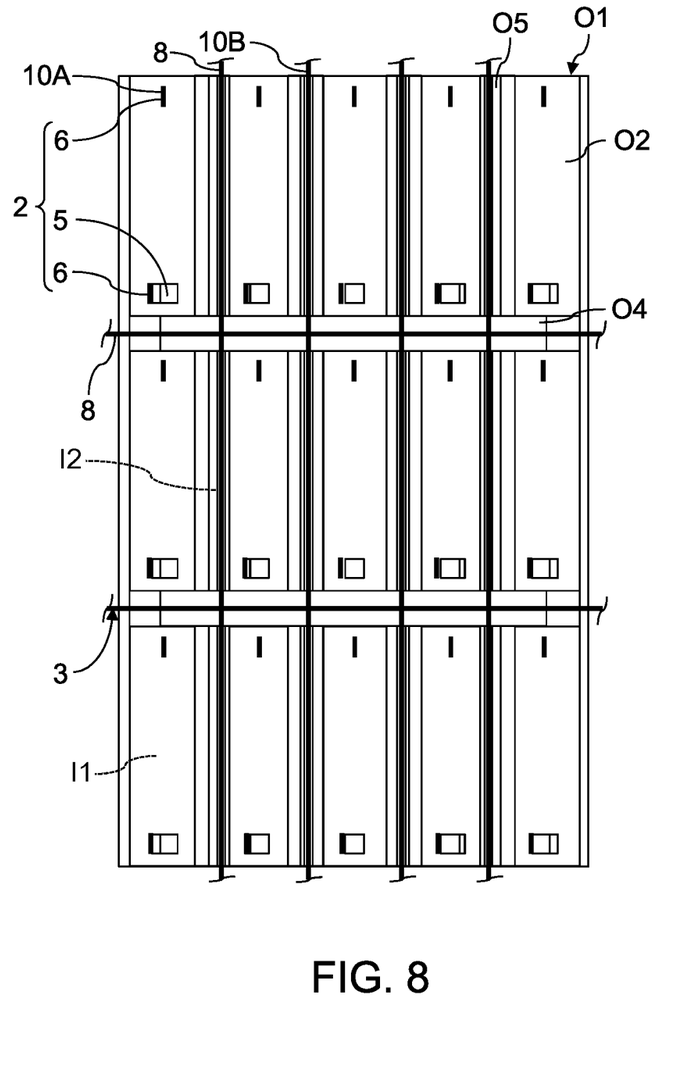
FIG. 8 is a top view showing another example of the ultrasonic transducers, the ultrasonic sensors and the strain sensors attached to an aircraft structural object.
Figure 9:
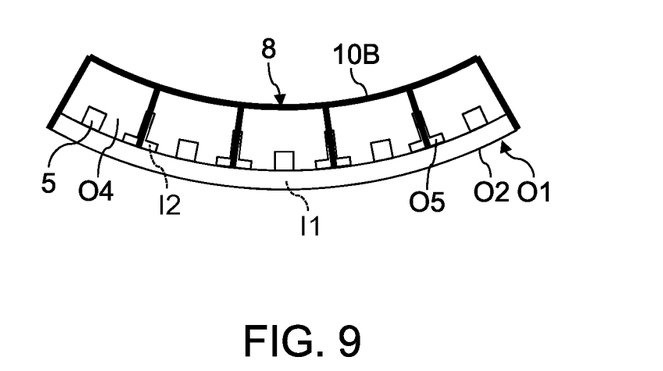
FIG. 9 is a side view of the aircraft structural object shown in FIG. 8.

FIG. 8 is a top view showing another example of the ultrasonic transducers 5, the ultrasonic sensors 6 and the strain sensors 8 attached to an aircraft structural object O1 while FIG. 9 is a side view of the aircraft structural object O1 shown in FIG. 8.

The aircraft structural object O1 composing a typical fuselage of an aircraft has structure in which frames O4 and stringers O5 are attached on the panel O2 as exemplified by FIG. 8 and FIG. 9. Accordingly, plate-like areas each surrounded by the adjacent frames O4 and the adjacent stringers O5 are formed in the aircraft structural object O1 included in the fuselage.

Also in the above-described aircraft structural object O1 included in the fuselage, the strain sensor 8 can be attached on each of the frames O4 and stringers O5, each having a complicated shape, on which loads are applied respectively while the ultrasonic transducers 5 and the ultrasonic sensors 6 can be attached to the portions of the panel O2 each surrounded by the frames O4 and the stringers O5.

Also in the example shown in FIG. 8, the first optical fiber sensors 10A are attached, as the ultrasonic sensors 6, to the portions of the panel O2 surrounded by the frames O4 and the stringers O5 while the second optical fiber sensors 10B are attached, as the strain sensors 8, on the upper surfaces of the frames O4 and the stringers O5 each having an inverted T-shaped cross section.

As described above, the strain sensors 8 can be attached to the reinforcing members, such as stringers, spars, ribs and frames, while the ultrasonic transducers 5 and the ultrasonic sensors 6 can be attached to the panel. Thereby, SHM of the aircraft structural object O1 including the first inspection areas I1 and the second inspection areas I2 can be performed by ultrasonic inspection of the panel including the first inspection areas I1 and the strain amount measurement of the reinforcing members including the second inspection areas I2. This is similar for the structural object O other than the aircraft structural object O1.

When SHM of the structural object O having a structure in which at least one reinforcing member is attached to a panel is performed, each strain sensor 8 may be attached to the at least one reinforcing member, not only by adhering the strain sensor 8 on the surface of the at least one reinforcing member, but also, by embedding the strain sensor 8 in the at least one reinforcing member as described in Japanese Patent Application Publication JP 2017-173191 A, for example, or by sandwiching the strain sensor 8 between the at least one reinforcing member and the panel. When the strain sensor 8, such as the optical fiber sensor 10, is sandwiched between a reinforcing member and a panel, strain amounts of the reinforcing member may be measured by embedding the strain sensor 8 in the panel side. In that case, since strain amounts of both a part of the reinforcing member and a part of the panel can be measured by the strain sensor 8, an area including the part of the reinforcing member and the part of the panel can also be set as the second inspection area I2.

SHM of the structural object O can be performed by obtaining at least one index expressing health of the structural object O. The signal processing part 4 is a signal processing circuit which obtains the at least one index expressing the health of the structural object O including the first inspection areas I1 and the second inspection areas I2, based on ultrasonic waveforms from the first inspection areas I1, detected by the ultrasonic sensors 6, and strain amounts of the second inspection areas I2, detected by the strain sensors 8.

Each detection signal of ultrasonic waveform is output, as an electric signal or an optical signal, from the ultrasonic sensor 6. On the other hand, each detection signal of strain amount of the second inspection area I2 is also output, as an electric signal or an optical signal, from the strain sensor 8. Therefore, the signal processing part 4 can be composed of the photodetectors 12, A/D (analog-to-digital) converters and electric circuitry, such as a computer. Each photodetector 12 converts an optical signal, as shown in FIG. 5 and FIG. 6, into an electric signal. Each A/D converter converts an analog electric signal into a digital electric signal. The electric circuitry performs signal processing of digital electric signals. In addition, optical elements, such as an optical filter, for signal processing of optical signals may be included in the signal processing part 4.

Concrete examples of a useful index, expressing health for SHM of the structural object O, include whether damage has arisen in the structural object O, whether a crack has arisen in the structural object O, whether delamination has arisen in the structural object O made of an FRP, an index expressing the degree of a defect which has arisen in the structural object O, and the like. Therefore, the signal processing part 4 can be configured to obtain at least one of these indexes.

The signal processing part 4 can obtain inspection information on SHM, including an index or indexes each showing health, by desired signal processing of at least one ultrasonic waveform signal detected from the first inspection area I1 and at least one strain amount of the second inspection area I2.

For example, when an ultrasonic waveform detected from the first inspection area I1 is analyzed to detect an abnormal change in the ultrasonic waveform, the existence of a defect, such as damage, a crack or delamination, in the first inspection area I1 can be detected. As a more concrete example, a signal waveform obtained by signal processing, such as averaging processing, filter processing for noise removal using an LPF (Low Pass Filter), an HPF (High Pass Filter) and the like, envelope detection processing, and frequency analysis processing by Fourier transform processing and/or wavelet transformation, of an ultrasonic waveform signal detected from the first inspection area I1 can be compared to a reference waveform which is a signal waveform in a case where no defect exists in the first inspection area I1. Then, when the signal waveform detected from the first inspection area I1 has deviated from the reference waveform with exceeding a threshold value, it can be determined that a defect has arisen in the first inspection area I1 and the waveform of the ultrasonic wave which has passed through the first inspection area I1 has changed due to the generated defect.

Moreover, when a waveform of an ultrasonic reflected wave has been detected from the first inspection area I1, a time at which an ultrasonic wave was oscillated from the ultrasonic transducer 5 towards the first inspection area I1 can be notified from the control circuit 7 of the ultrasonic transducer 5 to the signal processing part 4. Thereby, a position of a defect can also be estimated by measuring an elapsed time from the time, at which the ultrasonic wave was oscillated from the ultrasonic transducer 5, until a peak time of the reflected wave detected by the ultrasonic sensor 6.

When the structural object O is the aircraft structural object O1, the first inspection area I1 is vibrated, due to an applied aerodynamic load, during a flight of the aircraft. The vibration pattern of the first inspection area I1 during a flight of the aircraft dynamically changes according to momently changing various flight conditions including the speed and the altitude of the aircraft.

For that reason, at least one feature amount expressing vibration of the first inspection area I1 according to flight conditions of an aircraft can be obtained beforehand. Thereby, it becomes possible to perform ultrasonic inspection during a flight of the aircraft by signal processing for canceling the vibration of the first inspection area I1 due to the flight of the aircraft from vibration of each ultrasonic wave. Since the vibration according to flight conditions of an aircraft changes for every flight condition, the feature amount or feature amounts showing the vibration may be obtained not only by simulations and/or examinations but by a machine learning method statistically. This is similar in a case where the structural object O is a mobile object, such as an automobile, other than the aircraft structural objects O1.

On the other hand, when changes in strain amounts of the second inspection area I2 are analyzed, the existence of a defect, such as damage, a crack or delamination, can be detected in the second inspection area I2. As a more concrete example, each measured value of strain amount in the second inspection area I2 can be compared to a reference value of strain amount in a case where no defect exists in the second inspection area I2. When at least one measured value of strain amount has deviated from the reference value of strain amount with exceeding a threshold value, it can be determined that a defect has arisen in the second inspection area I2 and the at least one strain amount in the second inspection area I2 has increased due to the generated defect.

When the structural object O is the aircraft structural object O1, the second inspection area I2 deforms, due to an applied aerodynamic load, during a flight of an aircraft, and thereby the strain amounts of the second inspection area I2 change. The strain amounts of the second inspection area I2 during a flight of an aircraft also change dynamically according to momently changing various flight conditions including the speed and the altitude of the aircraft, similarly to the vibration pattern in the first inspection area I1.

For that reason, change amounts in strain amounts in the second inspection area I2 according to flight conditions of an aircraft can be obtained beforehand. Thereby, it becomes possible to extract strain amounts in the second inspection area I2 only due to a defect during a flight of the aircraft by signal processing for canceling the change amounts in strain amounts in the second inspection area I2 due to a flight of the aircraft from strain amounts in the second inspection area I2 measured by the strain sensor 8 or the strain sensors 8. Since the change amounts in strain amounts in the second inspection area I2 according to flight conditions of an aircraft change for every flight condition, similarly to vibration, the change amounts in strain amounts may be obtained not only by simulations and/or examinations but by a machine learning method statistically. This is similar in a case where the structural object O is a mobile object, such as an automobile, other than the aircraft structural objects O1.

When the strain sensor 8 is the optical fiber sensor 10, each measured value of strain amount in the second inspection area I2 is obtained by analyzing a waveform signal, showing a wavelength spectrum of a transmission light or a reflected light from the optical fiber sensor 10, output from the photodetector 12. That is, each measured value of strain amount in the second inspection area I2 is expressed as a change amount in peak wavelength of a signal waveform showing a wavelength spectrum of a transmission light or a reflected light output from the optical fiber sensor 10. Therefore, signal processing, such as averaging, filter processing and/or frequency analysis processing, similar to signal processing of an ultrasonic waveform signal, may be performed to each signal output from the photodetector 12.

When strain gauges are disposed at different positions, or when the optical fiber sensor 10 or the optical fiber sensors 10 can detect strain amounts at different positions, plural strain amounts at positions in the second inspection area I2 are measured. Therefore, not only the existence of a defect but also a position of the defect can be obtained based on the strain amounts of the second inspection area I2. In addition, when a temporal change in strain amount is measured, it becomes possible to grasp the degree in development of a defect.

When the second inspection area I2 from which the strain amounts are to be measured is sufficiently near a defect which has arisen in the first inspection area I1 which is the target of the ultrasonic inspection, the measured values of the strain amounts in the second inspection area I2 also changes slightly due to the defect which has arisen in the first inspection area I1. Therefore, the measured values of the strain amounts in the second inspection area I2 also allows estimation of the existence of a defect in the first inspection area I1 as well as in the second inspection area I2.

Accordingly, the signal processing part 4 can have a function to determine whether there is possibility that a defect has arisen in the first inspection area I1, based on the measured values of the strain amounts in the second inspection area I2 detected by the strain sensor 8 or the strain sensors 8. More specifically, when a slight change in strain amount according to which it is determined that no defect has arisen in the second inspection area I2 has been detected by threshold value processing, it can be determined that a detect may have arisen at a position in the first inspection area I1 near a position where the slight change in strain amount has been detected.

When the optical fiber sensor 10 is used as the strain sensor 8, the length of the optical fiber sensor 10 becomes long since the strain amounts in the second inspection area I2 having a wider range should be measured by the common optical fiber sensor 10 as exemplified by FIG. 7 and FIG. 8, and thereby only a part of the optical fiber sensor 10 may be near the first inspection area I1, or a plurality of parts of the optical fiber sensor 10 may be near the different first inspection areas I1 respectively. This is similar in a case where many strain gauges are disposed, as the strain sensors 8, at different positions.

Accordingly, the second inspection area I2 may be segmented into a plurality of areas so that it can be determined whether there is possibility that a defect has arisen in the first inspection area I1, based on the strain amounts in the nearest segmented area to the first inspection area I1 out of the segmented areas.

As a concrete example, when one common optical fiber sensor 10 is disposed zigzag along the two ridgelines in the mountain fold side and the two ridgelines in the valley fold side in the outside of the hat-shaped stringer O3 as shown in FIG. 7, two portions of the optical fiber sensor 10 disposed along the two ridgelines in the valley fold side are adjacent to the portions of the panel O2 in both sides of the hat-shaped stringer O3 and the portion of the panel O2 inside the hat-shaped stringer O3.

Accordingly, the second inspection area I2 can be divided into the first area R1 along the ridgeline in one valley fold side of the hat-shaped stringer O3, the second area R2 along the ridgeline in the other valley fold side of the hat-shaped stringer O3, and the other remaining area R3. Then, when at least one strain amount in one of the first area R1 and the second area R2 along the ridgelines in the valley fold side has increased to a degree in which it is determined that no defect has arisen in any of the first area R1 and the second area R2, it can be determined that a defect may have arisen in one of the first inspection area I1, defined as the portion of the panel O2 in the nearer one side of the hat-shaped stringer O3 to the one of the first area R1 and the second area R2, and the first inspection area I1, defined as the portion of the panel O2 inside the hat-shaped stringer O3.

As another concrete example, when the optical fiber sensor 10 or the optical fiber sensors 10 are disposed in grid pattern as shown in FIG. 8, the second inspection area I2 set in the frames O4 and the stringers O5 can be divided into areas at the respective positions where the optical fiber sensors 10 intersect with each other. Then, when at least one strain amount has increased in a certain area out of the divided areas included in the second inspection area I2, to a degree in which it is determined that no defect has arisen in the certain area, it can be determined that a defect may have arisen in at least one of the two first inspection areas I1 defined as rectangular areas of the panel O2 formed in both sides of the frame O4 or the stringer O5 whose strain amount or strain amounts have increased.

Each strain amount can be continuously measured by the optical fiber sensor 10 as long as light is entering the optical fiber sensor 10 from the light source 11. Alternatively, each strain amount can be continuously measured by an electrical resistance type strain gauge which detects the strain amount as a change in electrical resistance as long as a voltage is being applied from a power supply to the strain gauge. Accordingly, the inspection, such as detection of a defect, in the second inspection area I2 by measuring the strain amounts in the second inspection area I2, and the determination of whether a defect may have arisen in the first inspection area I1 can be continued by keeping each strain sensor 8 the operating state.

Meanwhile, in order to perform an ultrasonic inspection of the first inspection area I1, it is necessary to oscillate an ultrasonic wave from the ultrasonic transducer 5. When an ultrasonic wave is intermittently oscillated at a constant oscillation interval set short, an ultrasonic inspection can be also intermittently performed. Nevertheless, it is desired to set an oscillation interval of an ultrasonic wave to be long in order to decrease power consumption.

Accordingly, each ultrasonic wave may be manually oscillated by operation of an input device 7A coupled to the control circuit 7 of the ultrasonic transducer 5, or automatically oscillated at a constant interval determined so that the power consumption can be reduced. Instead, the determination of whether there is possibility that a defect has arisen in the first inspection area I1, by measuring the strain amounts in the second inspection area I2, can be continued. Then, the ultrasonic inspection of the first inspection area I1 can be performed just when it has been determined that a defect may have arisen in the first inspection area I1. Thereby, the demerit of ultrasonic inspection that uninterrupted inspection requires energy can be compensated by inspection of the strain amounts which is easy to be carried out continuously.

The ultrasonic inspection in the first inspection area I1 based on a measurement result of the strain amounts in the second inspection area I2 can be started automatically. In that case, what is necessary is to output control signals from the signal processing part 4 to the control circuit 7 of the ultrasonic transducer 5 so that the control circuit 7 controls the ultrasonic transducer 5 to oscillate at least one ultrasonic wave toward the first inspection area I1 in case where the signal processing part 4 has determined that a defect may have arisen in the first inspection area I1 based on the strain amounts of the second inspection area I2 detected by the strain sensor 8 or the strain sensors 8. That is, a determination result by the signal processing part 4 that a defect may have arisen in the first inspection area I1 can be used as a trigger for oscillating an ultrasonic wave from the ultrasonic transducer 5 to the first inspection area I1.

As a concrete example, when the strain amounts of the hat-shaped stringer O3 shown in FIG. 7 have increased slightly, it can be determined that a defect may have arisen in at least one of the portions of the panel O2 in both sides of the hat-shaped stringer O3, and then ultrasonic inspection of one or both of the portions of the panel O2 in both sides of the hat-shaped stringer O3 can be performed. As another concrete example, when the strain amounts of the frame O4 or the stringer O5 shown in FIG. 8 have locally increased slightly, it can be determined that a defect may have arisen in at least one of rectangular portions of the panel O2 in both sides of a portion of the frame O4 or the stringer O5 in which the strain amounts have increased, and then ultrasonic inspection of the rectangular portions of the panel O2 in both sides of the portion of the frame O4 or the stringer O5 can be performed.

As mentioned above, ultrasonic inspection based on an ultrasonic reflected wave in the first inspection area I1 allows calculation of a position of a defect in the first inspection area I1, based on a peak time of the ultrasonic reflected wave, acoustic velocity and the like. On the contrary, in case of ultrasonic inspection based on only a waveform of an ultrasonic wave which has transmitted the first inspection area I1, it is difficult to obtain a position of a defect in the first inspection area I1, except when many ultrasonic transducers 5 and ultrasonic sensors 6 are densely disposed.

Nevertheless, the strain amounts in the second inspection area I2 sometimes change due to the influence of a defect which has arisen in the first inspection area I1 which is a target of ultrasonic inspection, as mentioned above. It is considered that a distribution of the strain amounts which have changed in the second inspection area I2 changes depending on a position of a defect which has arisen in the first inspection area I1. Specifically, it is considered that, the closer a position in the second inspection area I2 is to a position of a defect which has arisen in the first inspection area I1, the larger a change amount in strain becomes.

For that reason, when the signal processing part 4 has determined that a defect has arisen in the first inspection area I1 based on at least one ultrasonic waveform detected by the ultrasonic sensor 6, as a result of ultrasonic inspection for the first inspection area I1, a defect arising area in the first inspection area I1 can be estimated based on a distribution of the strain amounts of the second inspection area I2 detected by the strain sensor 8 or the strain sensors 8, regardless of whether it has been previously determined that a defect may have arisen in the first inspection area I1 based on the strain amounts in the second inspection area I2.

Concrete examples of easy analysis processing based on a strain distribution include processing which narrows a defect arising area down to an area in the first inspection area I1 which is the nearest to the position of the second inspection area I2 at which the strain amount becomes a peak, compared with the other positions in the second inspection area I2. In this case, an area having a sector form or a shape derived by cutting off a part from a sector form can be extracted from the first inspection area I1 as a defect arising area, for example.

Concrete examples of complicated analysis processing based on a strain distribution include processing which estimates a defect arising area based on an actually measured strain distribution and reference information, stored in a storage, including a table or a function representing a relationship between positions of defects in the first inspection area I1 and distributions of the strain amounts of the second inspection area I2 obtained by repeating simulations and/or examinations. In this case, the estimation accuracy can be improved by a machine learning method or the like.

(Structural Health Monitoring Method)

Next, a method of structural health monitoring (SHM) of the structural object O using the structural health monitoring system 1 will be described.

Figure 10:
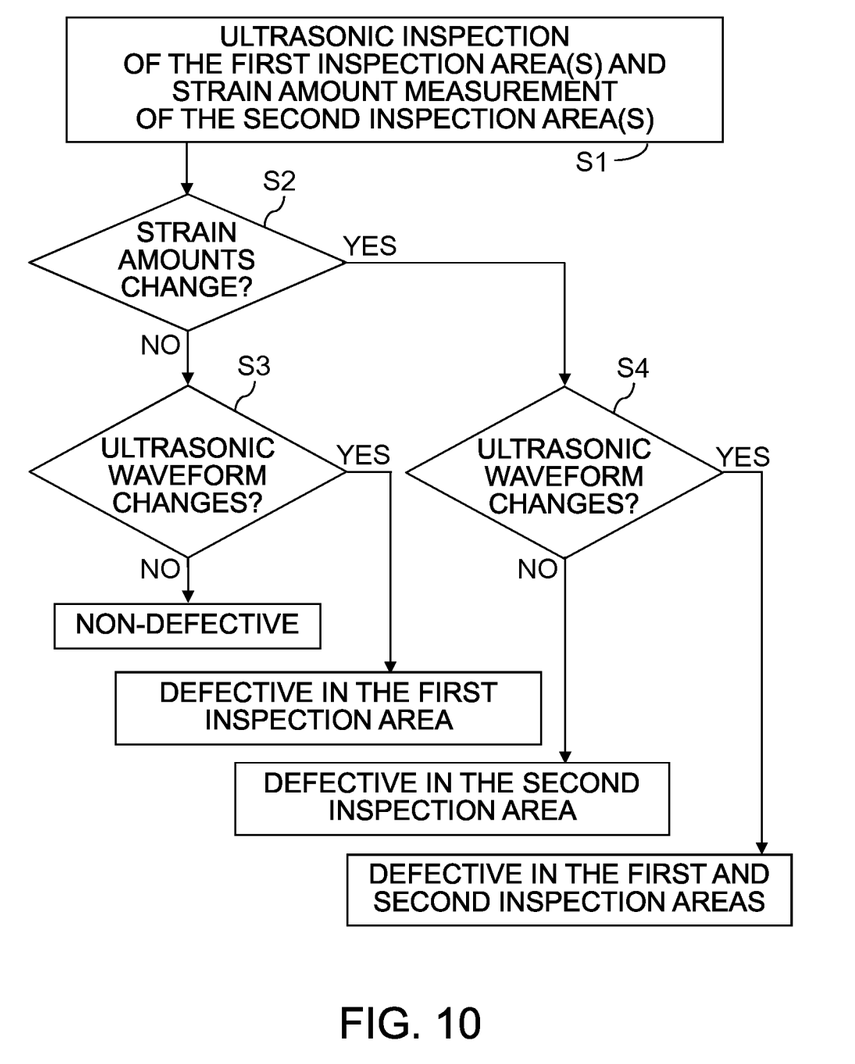
FIG. 10 is a flow chart showing an example of a flow for SHM of the structural object using the structural health monitoring system shown in FIG. 1.

FIG. 10 is a flow chart showing an example of a flow for SHM of the structural object O using the structural health monitoring system 1 shown in FIG. 1.

Firstly, in step S1, ultrasonic inspection of the plate-like first inspection areas I1 each including no bent portion and measurement of the strain amounts in the second inspection areas I2 each including at least one bent plate-like portion are performed. Specifically, the ultrasonic inspection unit 2 shown in FIG. 1 obtains at least one of waveforms of ultrasonic waves which have transmitted the first inspection areas I1 and waveforms of ultrasonic reflected waves which have been reflected in the first inspection areas I1. On the other hand, the strain amounts in the second inspection areas I2 are measured by the strain amount detection unit 3.

More specifically, an electric signal is applied to each ultrasonic transducer 5 from the control circuit 7 of the ultrasonic inspection unit 2 manually by operating the input device 7A or automatically at a constant interval. Thereby, ultrasonic waves are oscillated from the ultrasonic transducers 5 disposed in the structural object O, such as the aircraft structural object O1, as exemplified in FIG. 7 to FIG. 9, for example. The oscillated ultrasonic waves propagate the platy first inspection areas I1 with no bent portion, such as the panel O2 of the aircraft structural object O1, and then at least one of the waveforms of the ultrasonic transmission waves which have transmitted the first inspection areas I1 and the waveforms of the ultrasonic reflected waves which have been reflected in the first inspection areas I1, as exemplified by FIG. 2 to FIG. 4, are detected by the ultrasonic sensors 6, such as the first optical fiber sensors 10A as shown in FIG. 7 or 8.

When the ultrasonic sensor 6 is the optical fiber sensor 10 as exemplified by FIG. 5 or FIG. 6, a broadband laser light or the like is output from the light source 11 to the optical fiber sensor 10. Then, a waveform signal of an ultrasonic wave is output as an optical signal from the optical fiber sensor 10. Meanwhile, when the ultrasonic sensor 6 is the ultrasonic transducer as exemplified in FIG. 4, a waveform signal of an ultrasonic wave is output as an electric signal. The waveform signal of the ultrasonic wave detected by the ultrasonic sensor 6 is output from the ultrasonic sensor 6 to the signal processing part 4.

On the other hand, the strain amounts in the second inspection areas I2 are measured by the strain sensors 8 of the strain amount detection unit 3 shown in FIG. 1. As a concrete example, the strain amounts in the second inspection areas I2, such as the hat-shaped stringer O3, or the frames O4 and the stringers O5, each including at least one bent platy portion are measured by the strain sensors 8, such as the second optical fiber sensors 10B, disposed in the structural object O, such as the aircraft structural object O1, as exemplified by FIG. 7 to FIG. 9.

When the strain sensor 8 is the optical fiber sensor 10 as exemplified by FIG. 5 or FIG. 6, a broadband laser light or the like is output from the light source 11 to the optical fiber sensor 10. Then, a detection signal of at least one strain amount is output, as an optical signal, from the optical fiber sensor 10. Meanwhile, when the strain sensor 8 is an electric resistance type strain gauge, a detection signal of a strain amount is output as an electric signal. The detection signal of at least one strain amount detected by the strain sensor 8 is output from the strain sensor 8 to the signal processing part 4.

Next, the signal processing part 4 obtains at least one index expressing the health of the structural object O including the first inspection areas I1 and the second inspection areas I2, based on the ultrasonic waveforms detected by the ultrasonic sensors 6 and the strain amounts in the second inspection areas I2 detected by the strain sensors 8. As a concrete example, whether a defect has arisen in the first inspection areas I1 and the second inspection areas I2 can be obtained as an index expressing the health.

For that purpose, in step S2, it is determined whether each strain amount in the second inspection areas I2 has deviated from a reference strain amount. When it has been determined that any strain amount in the second inspection areas I2 has not deviated from the reference strain amount, it is determined whether each ultrasonic waveform acquired from the first inspection areas I1 has deviated from a reference ultrasonic waveform, in step S3. Moreover, when it has been determined that at least one strain amount in the second inspection areas I2 has deviated from the reference strain amount, it is also determined whether each ultrasonic waveform acquired from the first inspection areas I1 has deviated from the reference ultrasonic waveform, in step S4. Note that, the order of the determination of the existence of a variation in each ultrasonic waveform and the determination of the existence of a variation in each strain amount is flexible, and the order may be reversed or these determinations may be performed simultaneously by parallel processing.

When it has been determined that any of the ultrasonic waveforms acquired from the first inspection areas I1 and any of the strain amounts in the second inspection areas I2 have not deviated from the reference waveform and the reference strain amount respectively, it can be determined that any of the first inspection areas I1 and any of the second inspection areas I2 have no defect. Alternatively, it can be determined that the first inspection areas I1 have a defect when it has been determined that at least one ultrasonic waveform acquired from the first inspection areas I1 has deviated from the reference waveform while it can be determined that the second inspection areas I2 have a defect when it has been determined that at least one strain amount in the second inspection areas I2 has deviated from the reference strain amount. Therefore, when it has been determined that at least one ultrasonic waveform acquired from the first inspection areas I1 and at least one strain amount in the second inspection areas I2 have deviated from the reference waveform and the reference strain amount respectively, it can be determined that both the first inspection areas I1 and the second inspection areas I2 have defects.

(Effects)

As described above, the structural health monitoring system 1 and the method of monitoring structural health classify the structural object O into areas for ultrasonic inspection and areas for measuring strain amounts according to a shape of the structural object O, and perform SHM based on both of changes in ultrasonic waveforms and changes in strain amounts.

Accordingly, according to the structural health monitoring system 1 and the method of monitoring structural health, the restriction in SHM can be reduced and the inspection accuracy can be improved, compared with a case of SHM only by ultrasonic inspection or a case of SHM only by measuring strain amounts.

Specifically, SHM can be performed for the plate-like first inspection area I1, having no bent portion, by ultrasonic inspection even without disposing the strain sensors 8 comprehensively. In other words, detection omission of a defect due to lack of arrangement of the strain sensors 8 can be reduced. On the contrary, as for the second inspection area I2 including at least one bent plate-like portion, detection omission of a defect due to insufficient intensity of an propagating ultrasonic wave for detection of a defect can be reduced by SHM based on strain amounts.

That is, it becomes to possible to detect a defect, which cannot be detected by SHM only by measuring strain amounts, and a defect, which cannot be detected only by ultrasonic inspection, and thereby usage restrictions in the conventional SHM system can be reduced.

Moreover, since it becomes unnecessary to dispose many strain sensors 8 comprehensively in the plate-like first inspection area I1 having no bent portion, the number of the strain sensors 8, the data size of measured strain amounts and a signal processing amount can be remarkably reduced compared with those in the conventional SHM only by measurement of strain amounts. In particular, when the structural object O is the aircraft structural object O1, weight saving, which is important for an aircraft, can be attained by reducing the number of the strain sensors 8, the scale of a signal processing circuit, and the like.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A structural health monitoring system that monitors structural health of a structural object, the structural object including i) a first inspection area including no bent portion and ii) a second inspection area including a bent portion, the structural health monitoring system comprising:
    an ultrasonic transducer that is attached to the first inspection area including no bent portion, and that oscillates and emits an ultrasonic wave toward the first inspection area;
    an ultrasonic sensor that is attached to the first inspection area including no bent portion, and that detects a waveform of the ultrasonic wave emitted from the ultrasonic transducer, the waveform including at least one of i) a transmission wave of the ultrasonic wave having transmitted through the first inspection area and ii) a reflected wave of the ultrasonic wave having been reflected in the first inspection area;
    a strain sensor that is attached to the second inspection area including the bent portion, and that detects a strain amount of the second inspection area without using the ultrasonic wave emitted from the ultrasonic transducer; and
    signal processing circuitry that obtains at least one index, representing health of the structural object including the first inspection area and the second inspection area, based on i) the waveform detected by the ultrasonic sensor using the ultrasonic wave emitted from the ultrasonic transducer and ii) the strain amount detected by the strain sensor without using the ultrasonic wave emitted from the ultrasonic transducer.

2. The structural health monitoring system according to claim 1, wherein the at least one index includes at least one of whether the structural object has been damaged, whether the structural object has cracked, whether the structural object made of fiber reinforced plastic has delaminated, and an index expressing degree of a defect that has arisen on the structural object.

3. The structural health monitoring system according to claim 2, wherein the signal processing circuitry determines whether there is a possibility that the defect has arisen in the first inspection area, based on the detected strain amount in the second inspection area.

4. The structural health monitoring system according to claim 3, wherein the signal processing circuitry segments the second inspection area into areas, and determines whether there is the possibility, based on the strain amount in a selected area out of the segmented areas, the selected area being closest to the first inspection area.

5. The structural health monitoring system according to claim 3, further comprising:
    a control circuit that controls the ultrasonic transducer to oscillate the ultrasonic wave toward the first inspection area when the signal processing circuitry has determined that there is the possibility.

6. The structural health monitoring system according to claim 1, wherein the signal processing circuitry estimates an area in which a defect has arisen, based on the strain amount, when it has been determined that the defect has arisen in the first inspection area, based on the waveform.

7. An aircraft structural object comprising:
    the structural health monitoring system according to claim 1.

8. A method of monitoring the structural health of the structural object, the method comprising:
    using the structural health monitoring system according to claim 1.

9. A method of monitoring structural health of a structural object, the structural object including i) a first inspection area including no bent portion and ii) a second inspection area including a bent portion, the method comprising:
    oscillating and emitting, using an ultrasonic transducer, an ultrasonic wave toward the first inspection area;
    detecting, using an ultrasonic sensor, a waveform of the ultrasonic wave emitted from the ultrasonic transducer, the waveform including at least one of i) a transmission wave of the ultrasonic wave having transmitted through the first inspection area and ii) a reflected wave of the ultrasonic wave having been reflected in the first inspection area;
    detecting, using a strain sensor, a strain amount of the second inspection area using the ultrasonic wave emitted from the ultrasonic transducer; and
    obtaining an index, representing health of the structural object including the first inspection area and the second inspection area, based on i) the waveform detected by the ultrasonic sensor using the ultrasonic wave emitted from the ultrasonic transducer and ii) the strain amount detected by the strain sensor without using the ultrasonic wave emitted from the ultrasonic transducer.

10. The method according to claim 8, wherein the structural object includes an aircraft structural object having a panel and at least one reinforcing member attached to the panel, the at least one reinforcing member including at least one of a stringer, a spar, a rib and a frame, the panel including the first inspection area, the at least one reinforcing member including the second inspection area, the strain sensor being attached to the at least one reinforcing member, the ultrasonic transducer and the ultrasonic sensor being attached to the panel.

11. The method according to claim 8, wherein the ultrasonic wave is a Lamb wave.

12. The method according to claim 11, wherein the first inspection area including no bent portion is larger than the second inspection area including the bent portion, the first and second inspection areas being determined based on a characteristic of a Lamb wave and a variation in the strain amount that the Lamb wave propagates in a wider range than a range in which the variation in the strain amount propagates while a first attenuation amount in amplitude of the Lamb wave is larger than a second attenuation amount of the variation in the strain amount in the bent portion.

13. The structural health monitoring system according to claim 4, further comprising:

a control circuit that controls the ultrasonic transducer to oscillate the ultrasonic wave toward the first inspection area when the signal processing circuitry has determined that there is the possibility.

14. The structural health monitoring system according to claim 2, wherein the signal processing circuitry estimates an area in which the defect has arisen, based on the strain amount, when it has been determined that the defect has arisen in the first inspection area, based on the waveform.

15. An aircraft structural object comprising:
the structural health monitoring system according to claim 2.

16. An aircraft structural object comprising:
the structural health monitoring system according to claim 3.

17. An aircraft structural object comprising:
the structural health monitoring system according to claim 4.

18. The method according to claim 9, wherein the structural object includes an aircraft structural object having a panel and at least one reinforcing member attached to the panel, the at least one reinforcing member including at least one of a stringer, a spar, a rib and a frame, the panel including the first inspection area, the at least one reinforcing member including the second inspection area, the strain sensor being attached to the at least one reinforcing member, the ultrasonic transducer and the ultrasonic sensor being attached to the panel.

19. The method according to claim 9, wherein the ultrasonic wave is a Lamb wave.

20. The method according to claim 19, wherein the first inspection area including no bent portion is larger than the second inspection area including the bent portion, the first and second inspection areas being determined based on a characteristic of a Lamb wave and a variation in the strain amount that the Lamb wave propagates in a wider range than a range in which the variation in the strain amount propagates while a first attenuation amount in amplitude of the Lamb wave is larger than a second attenuation amount of the variation in the strain amount in the bent portion.

* * * * *